United States Patent
Liu

(10) Patent No.: US 11,153,927 B2
(45) Date of Patent: Oct. 19, 2021

(54) TRANSITION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 80 days.

(21) Appl. No.: 16/619,182

(22) PCT Filed: Aug. 2, 2017

(86) PCT No.: PCT/CN2017/095709
§ 371 (c)(1),
(2) Date: Dec. 4, 2019

(87) PCT Pub. No.: WO2019/024026
PCT Pub. Date: Feb. 7, 2019

(65) Prior Publication Data
US 2020/0154506 A1   May 14, 2020

(51) Int. Cl.
*H04W 76/27* (2018.01)
*H04L 5/00* (2006.01)
*H04W 28/02* (2009.01)

(52) U.S. Cl.
CPC .......... *H04W 76/27* (2018.02); *H04L 5/0082* (2013.01); *H04W 28/0257* (2013.01)

(58) Field of Classification Search
None
See application file for complete search history.

(56) References Cited

U.S. PATENT DOCUMENTS 9,451,522 B2 * 9/2016 Timus .................. H04W 24/02
2009/0213800 A1 8/2009 Lee et al.
(Continued)

FOREIGN PATENT DOCUMENTS

CN   105898894   8/2016
CN   107249221   10/2017
(Continued)

OTHER PUBLICATIONS

ITRI, "Discussion on RRC State Transition between Connected and Inactive", 3GPP Draft, R2-1706930, 3rd Generation Partersnip Project (3GPP), 3GPP TSG-RAN WG2 NR Ad Hoc, Jun. 29, 2017.
(Continued)

*Primary Examiner* — Lonnie V Sweet
(74) *Attorney, Agent, or Firm* — Hodgson Russ LLP

(57) ABSTRACT

Disclosed in embodiments of the present disclosure are a transition method, a network device, and a terminal device. The method includes: receiving, by a network device, supporting information associated with a terminal device which is sent from the terminal device; determining, by the network device, a target state of the terminal device to be transitioned to according to the supporting information, wherein the target state is a Radio Resource Control (RRC) idle state or an RRC inactive state; and enabling, by the network device, the terminal device to transition to the target state.

12 Claims, 3 Drawing Sheets

100

Receive, by a network device, supporting information associated with a terminal device which is sent from the terminal device — 110

Determine, by the network device, a target state of the terminal device to be transitioned to according to the supporting information, wherein the target state is a Radio Resource Control (RRC) idle state or an RRC inactive state — 120

Enable, by the network device, the terminal device to transition to the target state — 130

(56) References Cited

U.S. PATENT DOCUMENTS

| | | | | |
|---|---|---|---|---|
| 2012/0281566 A1* | 11/2012 | Pelletier | ............... | H04W 76/27 370/252 |
| 2013/0194941 A1* | 8/2013 | Lu | ..................... | H04W 76/27 370/252 |
| 2013/0260810 A1 | 10/2013 | Rayavarapu | | |
| 2014/0051485 A1 | 2/2014 | Wang et al. | | |
| 2015/0043460 A1 | 2/2015 | Hans et al. | | |
| 2018/0270895 A1* | 9/2018 | Park | .................... | H04W 76/27 |

FOREIGN PATENT DOCUMENTS

| | | |
|---|---|---|
| CN | 107484260 | 12/2017 |
| RU | 83176 | 5/2009 |
| WO | 2016105570 | 6/2016 |

OTHER PUBLICATIONS

European Patent Office, Search Report for EP Application No. 17920495.3, Mar. 13, 2020.

ITRI, "RRC State Transition between Connected and Inactive," 3GPP TSG-RAN WG2 Meeting #97, R2-1701343, Feb. 2017, 4 pages.

WIPO, ISR for PCT/CN2017/095709, Apr. 26, 2018.

FIIP, Office Action for RU Application No. 2019138457/07, dated Sep. 25, 2020.

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Dec. 2015.

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 13)," Dec. 2015.

IPI, Office Action for IN Application No. 201917050624, dated Feb. 2, 2021.

ISDEC, Office Action for CA Application No. 3063617, dated Jan. 21, 2021.

EPO, Extended European Search Report for EP Application No. 21156480.2, dated Jun. 2, 2021.

IPOS, Office Action for SG Application No. 11201910573T, dated Aug. 9, 2021.

* cited by examiner

TRANSITION METHOD, NETWORK DEVICE, AND TERMINAL DEVICE

CROSS-REFERENCE TO RELATED APPLICATION

This application is a U.S. national phase application of International Application No. PCT/CN2017/095709, filed Aug. 2, 2017, the entire disclosure of which is incorporated herein by reference.

TECHNICAL FIELD

Embodiments of the present disclosure generally relate to communication technologies, and more particularly, to a transition method, a network device and a terminal device.

BACKGROUND

In the fifth generation (5G) mobile communication systems, a terminal device has three states, namely, a Radio Resource Control (RRC) idle state, an RRC connected state, and an RRC inactive state. A terminal device in the RRC connected state may transition to the RRC idle state or the RRC inactive state when there is no data traffic.

SUMMARY

Embodiments of the present disclosure provide a transition method, a network device and a terminal device to improve system performance.

According to a first aspect, there is provided a transition method, including:

receiving, by a network device, supporting information associated with a terminal device which is sent from the terminal device;

determining, by the network device, a target state of the terminal device to be transitioned to according to the supporting information, wherein the target state is a Radio Resource Control (RRC) idle state or an RRC inactive state; and enabling, by the network device, the terminal device to transition to the target state.

The supporting information associated with a terminal device may be some specific information for supporting or assisting a network device to determine the target state of the terminal device to be transitioned to. For example, the supporting information may be mobile state information of the terminal device, some transmission characteristics of the current service of the terminal device, and the like.

In a 5G system, a terminal device has three RRC states: an RRC idle state, an RRC connected state, and an RRC inactive state. A terminal device in an RRC connected state may enter the RRC idle state or the RRC inactive state when no data needs to be processed.

The network device can determine the state which the terminal device transitions to based on some supporting information associated with the terminal device, so that the terminal device can transition to a relatively suitable state, thereby improving system performance.

In a possible implementation, the supporting information includes mobile state information of the terminal device and/or arrival time interval information of a current service of the terminal device;

determining, by the network device, a target state of the terminal device to be transitioned to according to the supporting information, includes:

determining, by the network device, the target state according to the mobile state information and/or the arrival time interval information.

According to an exemplary embodiment, the supporting information may be a service type of the current service of the terminal device.

In a possible implementation, determining, by the network device, the target state according to the mobile state information includes:

if a moving speed of the terminal device is greater than or equal to a first threshold, determining by the network device that the target state is the RRC idle state; and if the moving speed of the terminal device is smaller than the first threshold, determining by the network device that the target state is the RRC inactive state.

According to an exemplary embodiment, the terminal device can report the speed information or acceleration of the terminal device to the network device, and the network device determines the current mobile state of the terminal device. Further, the network device determines, according to a mapping relationship between mobile states and RRC states, which RRC state the terminal device should transition to. The terminal device can also directly report the current mobile state of the terminal device to the network device, and the network device directly determines which RRC state the terminal device should transition to according to the mapping relationship between mobile states and RRC states.

According to an exemplary embodiment, the network device may determine which RRC state the terminal device should transition to in consideration of multiple kinds of supporting information associated with the terminal device.

In a possible implementation, the method further includes: determining, by the network device, the first threshold from a plurality of thresholds corresponding to the terminal device.

In a possible implementation, the plurality of thresholds correspond to a plurality of bearers of the terminal device or a plurality of data streams of the terminal device.

In a possible implementation, determining, by the network device, the target state according to the arrival time interval information includes:

if the arrival time interval of the current service is greater than or equal to a second threshold, determining by the network device that the target state is the RRC idle state; and if the arrival time interval of the current service is smaller than the second threshold, determining by the network device that the target state is the RRC inactive state.

In a possible implementation, the method further includes: determining, by the network device, the second threshold from a plurality of thresholds corresponding to the terminal device.

In a possible implementation, the plurality of thresholds correspond to a plurality of bearers of the terminal device or a plurality of data streams of the terminal device.

According to an exemplary embodiment, the thresholds (i.e., the division manner) mentioned above may be specified by a protocol, or may be pre-configured by the network device. The specification of the protocol may be the factory default setting of the terminal device.

In a possible implementation, the supporting information is a state which the terminal device is intended to transition to;

determining, by the network device, a target state of the terminal device to be transitioned to according to the supporting information includes:

determining, by the network device, that the target state is the state which the terminal device is intended to transition to.

In a possible implementation, enabling, by the network device, the terminal device to transition to the target state, includes:

if the target state is the RRC idle state, releasing by the network device all radio bearers between the terminal device and the network device; and if the target state is the RRC inactive state, releasing by the network device a part of the radio bearers between the terminal device and the network device.

According to a second aspect, there is provided a transition method, including:

obtaining, by a terminal device, supporting information associated with the terminal device; and sending, by the terminal device, the supporting information to a network device, so that the network device determines a target state of the terminal device to be transitioned to, wherein the target state is a Radio Resource Control (RRC) idle state or an RRC inactive state.

In a possible implementation, the supporting information is a state which the terminal device is intended to transition to;

obtaining, by a terminal device, supporting information associated with the terminal device, includes:

determining, by the terminal device, the state which the terminal device is intended to transition to.

In a possible implementation, determining, by the terminal device, the state which the terminal device is intended to transition to, includes:

determining, by the terminal device, the state which the terminal device is intended to transition to according to mobile state information of the terminal device and/or arrival time interval information of a current service of the terminal device.

In a possible implementation, determining, by the terminal device, the state which the terminal device is intended to transition to according to mobile state information of the terminal device, includes:

if a moving speed of the terminal device is greater than or equal to a first threshold, determining by the terminal device that the state which the terminal device is intended to transition to is the RRC idle state; and if the moving speed of the terminal device is smaller than the first threshold, determining by the terminal device that the state which the terminal device is intended to transition to is the RRC inactive state.

In a possible implementation, the method further includes:

determining, by the terminal device, the first threshold from a plurality of thresholds corresponding to the terminal device.

In a possible implementation, the plurality of thresholds correspond to a plurality of bearers of the terminal device or a plurality of data streams of the terminal device.

In a possible implementation, determining, by the terminal device, the state which the terminal device is intended to transition to according to arrival time interval information of a current service of the terminal device, includes:

if the arrival time interval of the current service is greater than or equal to a second threshold, determining by the terminal device that the state which the terminal device is intended to transition to is the RRC idle state; and if the arrival time interval of the current service is smaller than the second threshold, determining by the terminal device that the state which the terminal device is intended to transition to is the RRC inactive state.

In a possible implementation, the method further includes:

determining, by the terminal device, the second threshold from a plurality of thresholds corresponding to the terminal device.

In a possible implementation, the plurality of thresholds correspond to a plurality of bearers of the terminal device or a plurality of data streams of the terminal device.

In a possible implementation, the supporting information includes mobile state information of the terminal device and/or arrival time interval information of a current service of the terminal device.

According to a third aspect, there is provided a network device, which may perform the methods in the first aspect or any possible implementation of the first aspect described above. In particular, the network device may include units for performing the methods in the first aspect or any possible implementation of the first aspect described above.

According to a fourth aspect, there is provided a terminal device, which may perform the methods in the second aspect or any possible implementation of the second aspect described above. In particular, the terminal device may include units for performing the methods in the second aspect or any possible implementation of the second aspect described above.

According to a fifth aspect, there is provided a network device. The network device includes: a memory, a processor, an input interface, and an output interface. The memory, the processor, the input interface, and the output interface are connected by a bus system. The memory is configured to store instructions, and the processor is configured to execute the instructions stored in the memory, so as to perform the methods in the first aspect or any possible implementation of the first aspect described above.

According to a sixth aspect, there is provided a terminal device. The terminal device includes: a memory, a processor, an input interface, and an output interface. The memory, the processor, the input interface, and the output interface are connected by a bus system. The memory is configured to store instructions, and the processor is configured to execute the instructions stored in the memory, so as to perform the methods in the second aspect or any possible implementation of the second aspect described above.

According to a seventh aspect, there is provided a computer storage medium for storing computer software instructions for performing the methods in the first aspect or any possible implementation of the first aspect or for performing the methods in the second aspect or any possible implementation of the second aspect. The computer software instructions include programs for executing the above designs.

According to an eighth aspect, there is provided a computer program product including instructions which, when executed on a computer, cause the computer to perform the methods in the first aspect or any possible implementation of the first aspect or for performing the methods in the second aspect or any possible implementation of the second aspect.

These and other aspects of the present disclosure will be more readily apparent from the following description of the embodiments.

DETAILED DESCRIPTION

Figure 1:
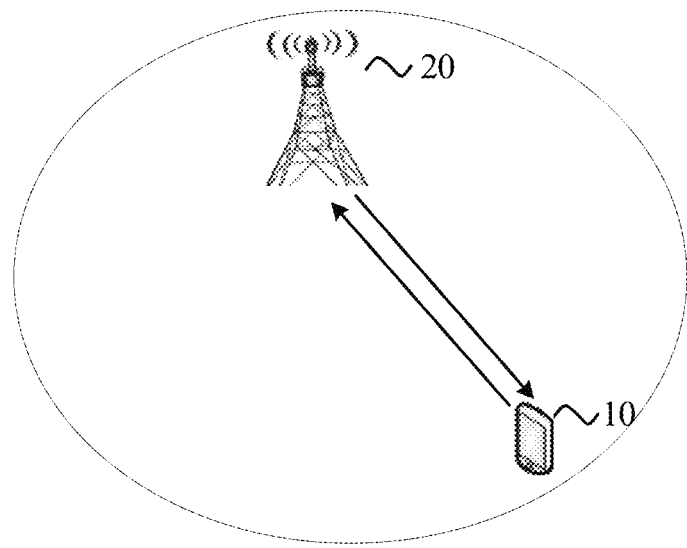
FIG. 1 is a schematic diagram of an application scenario according to an embodiment of the present disclosure.

The technical solutions in the embodiments of the present disclosure will be described below with reference to the accompanying drawings.

It should be understood that the technical solutions of the embodiments of the present disclosure can be applied to various communication systems, such as a global system of mobile communication (GSM) system, a code division multiple access (CDMA) system, and a wideband code division multiple access (WCDMA) system, a general packet radio service (GPRS) system, a long term evolution (LTE) system, a LTE frequency division duplex (FDD) system, a LTE time division duplex (TDD), an universal mobile telecommunication system (UMTS), a worldwide interoperability for microwave access (WiMAX) communication system, a new radio system, a future 5G system and the like.

In particular, the technical solutions of the embodiments of the present disclosure can be applied to various communication systems based on non-orthogonal multiple access technologies, such as a sparse code multiple access (SCMA) system, or a low-density signature (LDS) system, or the like. The SCMA system and the LDS system may also be referred to as other names in the communication field. Further, the technical solutions of the embodiments of the present disclosure can be applied to multi-carrier transmission systems using non-orthogonal multiple access technologies, for example, Orthogonal Frequency Division Multiplexing (OFDM), Filter Bank Multi-Carrier (FBMC), Generalized Frequency Division Multiplexing (GFDM), Filtered-OFDM (F-OFDM) systems using the non-orthogonal multiple access technologies.

The terminal device in embodiments of the present disclosure may refer to a user equipment (UE), an access terminal, a subscriber unit, a subscriber station, a mobile station, mobile equipment, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with a wireless communication capability, a computing devices or other processing devices connected to wireless modems, an in-vehicle device, a wearable device, a terminal device in a future 5G networks, or a terminal device in a future evolutional public land mobile network (PLMN), and so on, and embodiments of the present disclosure do not impose specific limitations on this.

The network device in embodiments of the present disclosure may be a device for communicating with the terminal device, for example, the network device may be a base transceiver station (BTS) in the GSM system or the CDMA system, or a node base (NodeB, NB) in the WCDMA system, or an evolutional node base (eNB or eNodeB) in the LTE system, or the network device may be a wireless controllers in a cloud radio access network (CRAN) scenario, or the network device may be a relay station, an access point, an in-vehicle device, a wearable device, and a network side device in a future 5G network or a network side device in a future evolutional PLMN network, and embodiments of the present disclosure do not impose specific limitations on this.

FIG. 1 is a schematic diagram of an application scenario according to an embodiment of the present disclosure. The communication system in FIG. 1 may include a terminal device 10 and a network device 20. The network device 20 is configured to provide communication services for the terminal device 10 and access a core network. The terminal device 10 accesses the network by searching for synchronization signals, broadcast signals, and the like transmitted by the network device 20, thereby performing communication with the network. The arrows shown in FIG. 1 may represent uplink/downlink transmissions by a cellular link between the terminal device 10 and the network device 20.

Figure 2:
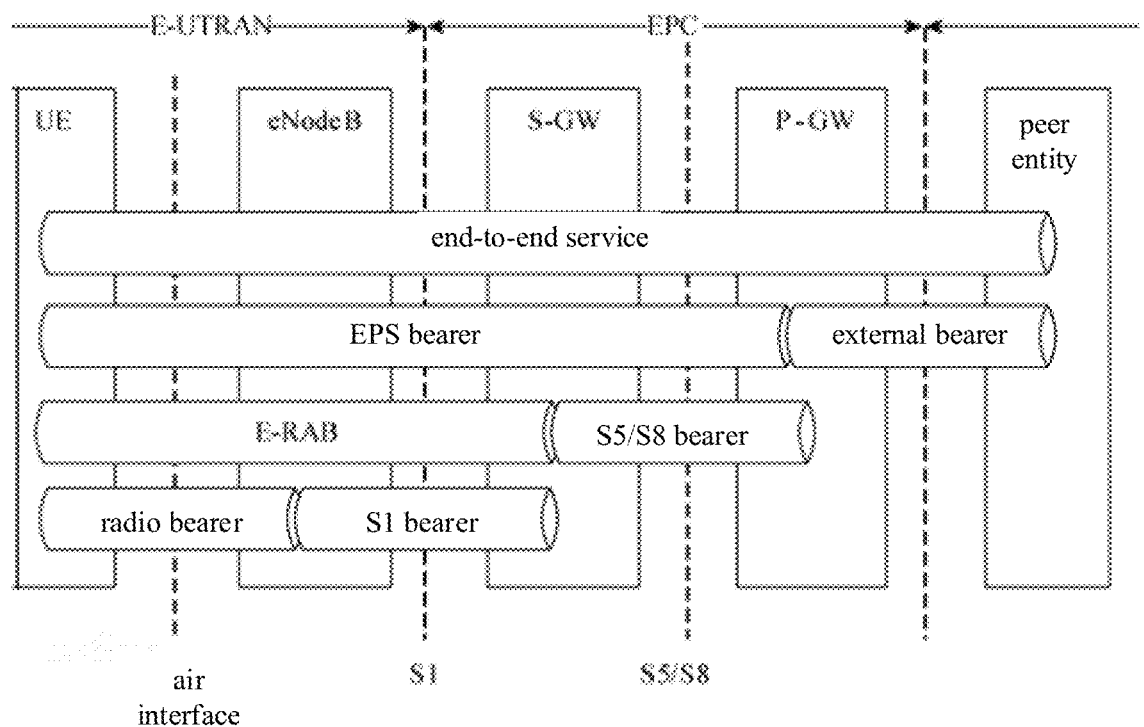
FIG. 2 shows an architectural of an EPS bearer service.

In order to facilitate the understanding of the embodiments of the present disclosure, some elements in the Evolved Packet System (EPS) bearer service architecture will be briefly described below with reference to FIG. 2. As shown in FIG. 2, the network architecture mainly includes an Evolved-Universal Mobile Telecommunication System Terrestrial Radio Access Network (E-UTRAN) and an Evolved Packet Core (EPC). In the service architecture of the EPS bearers, the end-to-end service can be decomposed into two parts: the EPS bearer and the external bearer. An Evolved Radio Access Bearer (E-RAB) is used to transmit an EPS bearer packet between the UE and the evolved EPC. The E-RAB and the EPS bearer have a one-to-one correspondence. A radio bearer is used to transmit a packet of an E-RAB bearer between the UE and the eNodeB, and there is a one-to-one correspondence between the radio bearers and the E-RAB/EPS bearers. An S1 bearer is used to transmit an E-RAB bearer packet between the eNodeB and a Serving GateWay (S-GW). An S5/S8 bearer is used to transmit a packet of an EPS bearer between the S-GW and a Packet Data Network Gateway (PDN-GW).

In the LTE system, the RRC state of a UE mainly includes an RRC idle state and an RRC connected state. In the RRC idle state, there is an S5/S8 bearer, there is no radio bearer and S1 bearer, the core network side reserves the UE context, the eNodeB and the UE do not reserve contexts of each other, and the terminal reserves a unique identifier within time advance (TA) (usually Temporary Mobile Subscriber Identity (TMSI). A UE in the RRC idle state does not have activities such as a data exchange with the network, a discontinuous reception (DRX) procedure configured by a non-access stratum (NAS), system information broadcast and paging, neighbor cell measurement, mobility for cell reselection, measurement reports, or the like. In the RRC connected state, there are the S5/S8 bearer, the S1 bearer, and the radio bearer, the core network, the eNodeB, and the UE all reserve corresponding contexts. The eNodeB allocates an access stratum (AS) identifier, usually a cell radio network temporary identifier (C-RNTI). The UE in the RRC connected state can exchange data with the network, and may have the DRX configured by the AS, may have the mobility for the handover, and may report channel measurements to the network side, and so on.

In the 5G system, a third state, i.e., the RRC inactive state, is introduced. In the RRC inactive state, there are the S5/S8 bearer, the S1 bearer, and a part of the radio bearers, the core network, the eNodeB, and the UE all reserve the corresponding contexts, and the eNodeB allocates the access stratum AS identifier, usually the Resume Identification (ID). The UE in the RRC inactive state has the mobility for cell reselection, has no measurement report, and can perform small data transmission and reception, and there may be DRX configured by the AS.

Therefore, in the 5G system, the UE mainly has the above three RRC states. When the UE in the RRC connected state has no data to be processed, it may transition to the RRC inactive state or the RRC idle state as needed.

Figure 3:
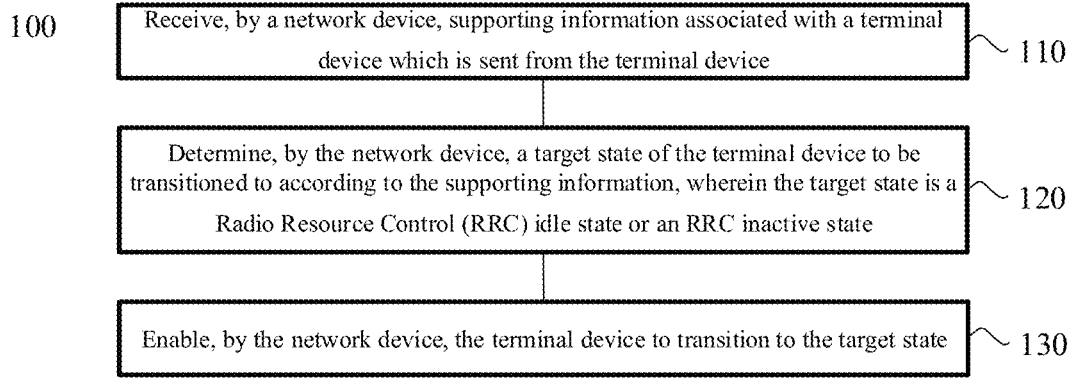
FIG. 3 shows a schematic block diagram of a transition method according to an embodiment of the present disclosure.

FIG. 3 shows a schematic block diagram of a transition method 100 according to an embodiment of the present disclosure. As shown in FIG. 3, the method 100 includes a part or all of the following contents:

In S110, a network device receives supporting information associated with a terminal device which is sent from the terminal device.

In S120, the network device determines a target state of the terminal device to be transitioned to according to the supporting information. The target state is a Radio Resource Control (RRC) idle state or an RRC inactive state.

In S130, the network device enables the terminal device to transition the target state.

The supporting information associated with the terminal device may be some specific information for assisting or supporting the network device to determine the target state which the terminal device should transition to. For example, the supporting information is mobile state information of the terminal device, some transmission characteristics of the current service of the terminal device, and the like.

Specifically, the network device may configure some rules, or protocols may specify some rules in advance. For example, the network device may configure that if terminal device is in a high-speed mobile state, the network device may make the terminal device transition to the RRC idle state, or the network device may configure that if the arrival time interval of the current service of the terminal is relatively long, the network device may make the terminal device transition to the RRC idle state, and so on. In a word, the network device can configure a mapping relationship between information associated with the terminal device and the RRC states in advance. When the terminal device in the RRC connected state has no data to be processed, the terminal device can report some current information of the terminal device to the network device, and the network device can use the information reported by the terminal device and some previously configured rules to determine which RRC state the terminal device will transition to.

Therefore, in the transition method according to the embodiment of the present disclosure, the network device may determine the state of the terminal device which the terminal device should transition to based on some supporting information of the terminal device, so as to make the terminal device to transition to a relatively suitable state, thereby improving system performance.

According to an exemplary embodiment, the terminal device may report the information of the terminal device to the network device in the case that the terminal device determines that no uplink data is to be sent to the network device or no downlink data is to be received. For example, the terminal device may receive indication information sent by the network device to the terminal device, the indication information is used to indicate that there is currently no downlink data to be transmitted, and the terminal device may report the supporting information to the network device according to the indication information. For another example, the terminal device can determine that there is currently no downlink data to be received according to a certain rule. For example, if the terminal device does not receive downlink data within a certain time period, the terminal device can determine that there is currently no downlink data transmission, and then the terminal device can report the supporting information to the network device.

According to an exemplary embodiment of the present disclosure, the supporting information may be mobile state information of the terminal device and/or transmission characteristics of the terminal device. The transmission characteristics of the terminal device may be some transmission characteristics of the current service of the terminal device. For example, the transmission characteristics may be the arrival time interval of the current service, the type of the current service, and the like. In any case, any information that can assist the network device to determine the state which the terminal device should transition to can be within the protection scope of the embodiments of the present disclosure.

As an exemplary embodiment, determining, by the network device, the target state according to the mobile state information includes: if a moving speed of the terminal device is greater than or equal to a first threshold, determining by the network device that the target state is the RRC idle state; and if the moving speed of the terminal device is smaller than the first threshold, determining by the network device that the target state is the RRC inactive state.

Specifically, the network device may configure a rule for the mobile state information of the terminal device in advance. For example, the mobile state of the terminal device may be divided into a high speed mobile state and a low speed mobile state. The network device can map the high speed mobile state and the RRC idle state, and map the low speed mobile state to the RRC inactive state. The network device can also define the high speed mobile state and the low speed mobile state. For example, a threshold may be configured for the moving speed of the terminal device, and if the current moving speed of the terminal device is greater than or equal to the threshold, the terminal device may be considered to be currently in a high speed mobile state; if the current moving speed of the terminal device is smaller than the threshold, the terminal device can be considered to be currently in a low speed mobile state. It is also possible to configure a threshold for the acceleration of the terminal device. Assuming that the terminal device is currently performing an acceleration motion, if the current acceleration of the terminal device is greater than or equal to the threshold, the terminal device may be considered to be in a high speed mobile state, and if the current acceleration of the terminal device is smaller than the threshold, the terminal device can be considered to be in a low speed mobile state.

According to an exemplary embodiment, the terminal device can directly report the speed or the acceleration of the current motion to the network device, and the network device determines whether the terminal device is currently in a high speed mobile state or a low speed mobile state, and the network device may further determine which RRC state the terminal device should transition to according to the mapping relationship between the motion states of the terminal device and the RRC states of the terminal device. The terminal device can also determine whether the terminal device itself is currently in a high speed mobile state or a low speed mobile state, and directly report the current motion state of the terminal device to the network device, and the network device can further determine which RRC state the terminal device should transition to directly according to the mapping relationship between the motion states of the terminal device and the RRC states of the terminal device. The terminal device can directly report the speed or the acceleration of the current motion to the network device. The network device directly determines which RRC state the terminal device should transition to directly according to the relationship between the speed or the acceleration of the terminal device and the thresholds, or the mapping relationship between the speed or the acceleration of the terminal device and the RRC states of the terminal device.

It should be understood that in the above embodiments, the mobile state information of the terminal device for determining the RRC state which the terminal device should transition to is the speed and the acceleration of the terminal device, and however, embodiments of the present disclosure are not limited to this.

Which RRC state the terminal device should transition to may be determined according to the mobile state of the terminal device. For example, if the terminal device is currently in a high speed mobile state, the terminal device is likely to move to the cell covered by other network device in the next moment. If the terminal device currently has no data to be processed, the terminal device may transition to the RRC idle state to reduce the power consumption of the terminal. If the terminal device has data which needs to be processed, other network devices may send paging information, or the terminal device may directly initiate the random access procedure to the other network devices. At this time, if the terminal device transitions to the RRC active state, when there is data to be transmitted, it is necessary to perform handover to complete the data transmission, then the period during which the terminal device is switched to the inactive state causes unnecessary power consumption of the terminal. Similarly, if the terminal device is currently in a low speed mobile state, the terminal device should still be in the cell covered by the current network device in the next moment. When the terminal device currently has no data which needs to be processed, the terminal device may transition to the RRC inactive state, so that the terminal device can quickly enter the RRC connected state when there is data to be transmitted in the next moment, or the terminal device can transmit small amount of data directly in the RRC inactive state if the data amount is relatively small in the next moment. In this way, the signaling overhead between the terminal device and the network device can be saved, thereby improving system performance.

As an exemplary embodiment, determining, by the network device, the target state according to the arrival time interval information includes: if the arrival time interval of the current service is greater than or equal to a second threshold, determining by the network device that the target state is the RRC idle state; and if the arrival time interval of the current service is smaller than the second threshold, determining by the network device that the target state is the RRC inactive state.

Specifically, the network device may configure a rule for the arrival time interval information of the terminal device in advance. For example, a threshold may be configured for the arrival time interval of the current service (i.e., the cycle of the current service) of the terminal device. If the arrival time interval of the current service of the terminal device is greater than or equal to the threshold, the terminal device may transition to the RRC idle state to reduce power consumption of the terminal. If the arrival time interval of the current service of the terminal device is smaller than the threshold, the terminal device may be transition to the RRC inactive state, so that the terminal device may quickly enter the RRC connected state in the next data transmission.

It should be understood that the arrival time interval of the current service may be an attribute of the current service, or may be an arrival period of the service that is detected by the terminal device, which is not limited in embodiments of the present disclosure.

As an exemplary embodiment, the network device determines the target state according to the service type of the current service of the terminal device. Specifically, the network device may configure a rule in advance. For example, the rule may be that if the service type is a big data service type, the terminal device may be enabled to transition to the RRC idle state; and if the service type is a small data service type, the terminal device may be enabled to transition to the RRC inactive state. The big data service type can be, for example, video, voice, and the like. The small data service type can be information for example. In a word, if the service type is a small data service type, the terminal device can directly perform data transmission in the RRC inactive state, and the RRC connected state is not required. In this way, signaling overhead between the terminal device and the network device can be reduced, thereby improving system performance.

It should be understood that the above embodiments are described by taking the examples of the transmission characteristics of the terminal device, such as the mobile state information, the service type and the arrival time interval of the current service, and however embodiments of the present disclosure do not impose specific limitations on this.

According to an exemplary embodiment of the present disclosure, the network device may further configure a plurality of thresholds for different kinds of supporting information. Which threshold is specifically used for judgment may be selected by the network device. For example, the network device may directly configure a plurality of thresholds for the terminal device, and the network device may randomly select a threshold as a criterion for determining, or may select a threshold as a criterion for determining based on a certain rule. For example, when the arrival time interval of the current service is relatively long, the network device may select a relatively small threshold for the moving speed of the terminal device; or when the arrival time interval of the current service is relatively short, the network device may select a relatively big threshold for the moving speed of the terminal device.

According to an exemplary embodiment of the present disclosure, the plurality of thresholds may correspond to bearers or data streams of the terminal device. For example, the network device may configure a speed threshold for at least one bearer or at least one data stream. Alternatively, the network device can configure a threshold of an arrival time interval for at least one bearer or at least one data stream.

It should be understood that the above thresholds (i.e., the division manner) mentioned above may be specified by a protocol, or may be pre-configured by the network device. The specification of the protocol may be the factory default setting of the terminal device.

It should also be understood that the combination of various supporting information of the terminal device described above can be associated with the RRC states. For example, the target state may be determined according to both the moving speed and the arrival time interval of the current service; or, the target state may be determined according to the arrival time interval of the current service and the service type of the current service, and embodiments of the present disclosure are not limited thereto.

According to an exemplary embodiment of the present disclosure, the supporting information is a state which the terminal device is intended to transition to. Determining, by the network device, a target state of the terminal device to be transitioned to according to the supporting information includes: determining, by the network device, that the target state is the state which the terminal device is intended to transition to.

Specifically, the terminal device may report the recommended transition state to the network device, and the terminal device may determine a recommended transition state by taking some supporting information of the terminal device into consideration. For example, the terminal device may determine the state which the terminal device is intended to transition to by taking the mobile state information of the terminal device, the arrival time interval of the current service of the terminal device, the service type, or some other transmission characteristics. How to determine the state which the terminal device is intended to transition to according to the supporting information is similar to that described above, and repeated descriptions are omitted here.

According to an exemplary embodiment of the present disclosure, enabling, by the network device, the terminal device to transition to the target state, includes: if the target state is the RRC idle state, releasing by the network device all radio bearers between the terminal device and the network device; and if the target state is the RRC inactive state, releasing by the network device a part of the radio bearers between the terminal device and the network device.

The network device may instruct the terminal device to enter the above RRC states by using high layer signaling. How to instruct the terminal device is similar to the existing scheme, and detailed descriptions are omitted here.

Figure 4:
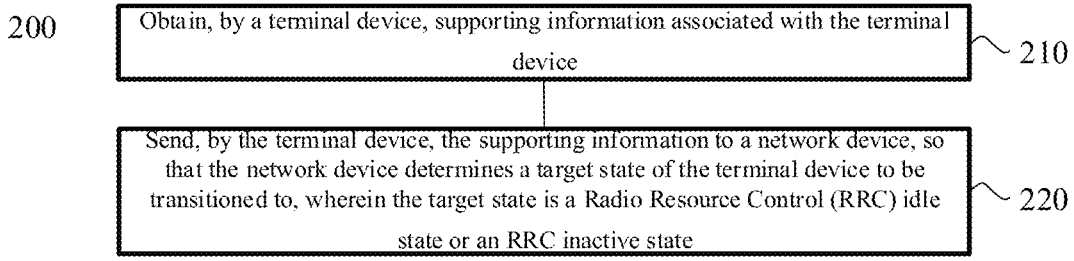
FIG. 4 shows another schematic block diagram of a transition method according to an embodiment of the present disclosure.

FIG. 4 shows a schematic block diagram of a transition method 200 according to an embodiment of the present disclosure. As shown in FIG. 4, the method 200 includes some or all of the following contents:

In S210, a terminal device obtains supporting information associated with the terminal device.

In S220, the terminal device sends the supporting information to a network device, so that the network device determines a target state of the terminal device to be transitioned to. The target state is a Radio Resource Control (RRC) idle state or an RRC inactive state.

In the transition method according to the embodiment of the present disclosure, the terminal device helps the network device determine the state of the terminal device to be transitioned to by reporting some supporting information to the network device. In this way, the terminal device may transition to a relatively suitable state, thereby improving system performance.

According to an exemplary embodiment of the present disclosure, the supporting information is a state which the terminal device is intended to transition to. Obtaining, by a terminal device, supporting information associated with the terminal device, includes: determining, by the terminal device, the state which the terminal device is intended to transition to.

According to an exemplary embodiment of the present disclosure, determining, by the terminal device, the state which the terminal device is intended to transition to, includes: determining, by the terminal device, the state which the terminal device is intended to transition to according to mobile state information of the terminal device and/or arrival time interval information of a current service of the terminal device.

According to an exemplary embodiment of the present disclosure, determining, by the terminal device, the state which the terminal device is intended to transition to according to mobile state information of the terminal device, includes: if a moving speed of the terminal device is greater than or equal to a first threshold, determining by the terminal device that the state which the terminal device is intended to transition to is the RRC idle state; and if the moving speed of the terminal device is smaller than the first threshold, determining by the terminal device that the state which the terminal device is intended to transition to is the RRC inactive state.

According to an exemplary embodiment of the present disclosure, the method further includes: determining, by the terminal device, the first threshold from a plurality of thresholds corresponding to the terminal device.

According to an exemplary embodiment of the present disclosure, the plurality of thresholds correspond to a plurality of bearers of the terminal device or a plurality of data streams of the terminal device.

According to an exemplary embodiment of the present disclosure, determining, by the terminal device, the state which the terminal device is intended to transition to according to arrival time interval information of a current service of the terminal device, includes: if the arrival time interval of the current service is greater than or equal to a second threshold, determining by the terminal device that the state which the terminal device is intended to transition to is the RRC idle state; and if the arrival time interval of the current service is smaller than the second threshold, determining by the terminal device that the state which the terminal device is intended to transition to is the RRC inactive state.

According to an exemplary embodiment of the present disclosure, the method further includes: determining, by the terminal device, the second threshold from a plurality of thresholds corresponding to the terminal device.

According to an exemplary embodiment of the present disclosure, the plurality of thresholds correspond to a plurality of bearers of the terminal device or a plurality of data streams of the terminal device.

According to an exemplary embodiment of the present disclosure, the supporting information includes mobile state information of the terminal device and/or arrival time interval information of a current service of the terminal device.

In the embodiments described from the perspective of the terminal device, the interactions between the terminal device and the network device, related characteristics or functions, are corresponding to that in the embodiments described from the perspective of the network device. In other words, what information the terminal device sends to the network device is the same one that the network device receives. For brevity, repeated descriptions are omitted.

It should also be understood that, in various embodiments of the present disclosure, the sequence numbers of the above processes/steps do not mean the order of execution of the processes/steps, and the order of execution of processes/steps should be determined by their functions and internal logic, and the sequence numbers of the above processes/steps do not impose any limitations on the implementations of the present disclosure.

The transition methods according to embodiments of the present disclosure are described in detail above. The transition devices according to embodiments of the present disclosure will be described below with reference to FIGS. 5 to 8. The technical features described in the method embodiments are applicable to the following device embodiments.

Figure 5:
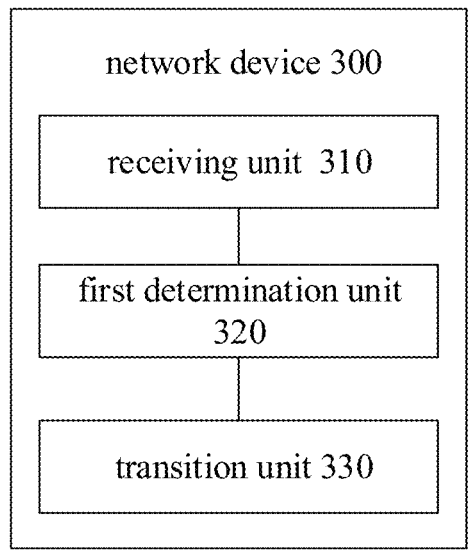
FIG. 5 shows a schematic block diagram of a network device according to an embodiment of the present disclosure.

FIG. 5 shows a schematic block diagram of a network device 300 according to an embodiment of the present disclosure. As shown in FIG. 5, the network device 300 includes a receiving unit 310, a first determination unit 320 and a transition unit 330.

The receiving unit 310 is configured to receive supporting information associated with a terminal device which is sent from the terminal device.

The first determination unit 320 is configured to determine a target state of the terminal device to be transitioned to according to the supporting information. The target state is a Radio Resource Control (RRC) idle state or an RRC inactive state.

The transition unit 330 is configured to enable the terminal device to transition to the target state.

The network device according to the embodiment of the present disclosure can determine the state which the terminal device should transition to based on some supporting information associated with the terminal device, so that the terminal device can transition to a relatively suitable state, thereby improving system performance.

According to an exemplary embodiment of the present disclosure, the supporting information includes mobile state information of the terminal device and/or arrival time interval information of a current service of the terminal device. The first determination unit is configured to: determine the target state according to the mobile state information and/or the arrival time interval information.

According to an exemplary embodiment of the present disclosure, the first determination unit is configured to: if a moving speed of the terminal device is greater than or equal to a first threshold, determine that the target state is the RRC idle state; and if the moving speed of the terminal device is smaller than the first threshold, determine that the target state is the RRC inactive state.

According to an exemplary embodiment of the present disclosure, the network device further includes a second determination unit configured to determine the first threshold from a plurality of thresholds corresponding to the terminal device.

According to an exemplary embodiment of the present disclosure, the plurality of thresholds correspond to a plurality of bearers of the terminal device or a plurality of data streams of the terminal device.

According to an exemplary embodiment of the present disclosure, the first determination unit is configured to: if the arrival time interval of the current service is greater than or equal to a second threshold, determine that the target state is the RRC idle state; and if the arrival time interval of the current service is smaller than the second threshold, determine that the target state is the RRC inactive state.

According to an exemplary embodiment of the present disclosure, the network device further includes a second determination unit configured to determine the second threshold from a plurality of thresholds corresponding to the terminal device.

According to an exemplary embodiment of the present disclosure, the plurality of thresholds correspond to a plurality of bearers of the terminal device or a plurality of data streams of the terminal device.

According to an exemplary embodiment of the present disclosure, the supporting information is a state which the terminal device is intended to transition to. The first determination unit is configured to: determine that the target state is the state which the terminal device is intended to transition to.

According to an exemplary embodiment of the present disclosure, the transition unit is configured to: if the target state is the RRC idle state, release all radio bearers between the terminal device and the network device; and if the target state is the RRC inactive state, release a part of the radio bearers between the terminal device and the network device.

It should be understood that the network device 300 according to the embodiments of the present disclosure may correspond to the network device in the method embodiments of the present disclosure, and the foregoing and other operations and/or functions of respective units in the network device 300 are used to implement corresponding processes of the network device as described with reference to FIG. 3. For brevity, repeated descriptions are omitted.

Figure 6:
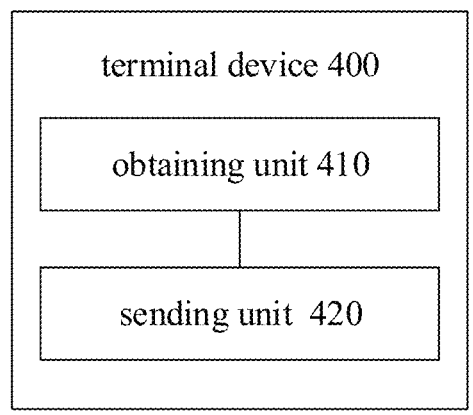
FIG. 6 shows a schematic block diagram of a terminal device according to an embodiment of the present disclosure.

FIG. 6 shows a schematic block diagram of a terminal device 400 according to an embodiment of the present disclosure. As shown in FIG. 6, the terminal device 400 includes an obtaining unit 410 and a sending unit 420.

The obtaining unit 410 is configured to obtain supporting information associated with the terminal device.

The sending unit is configured to send the supporting information to a network device, so that the network device determines a target state of the terminal device to be transitioned to. The target state is a Radio Resource Control (RRC) idle state or an RRC inactive state.

The terminal device according to the embodiment of the present disclosure helps the network device determine the state of the terminal device to be transitioned to by reporting some supporting information to the network device. In this way, the terminal device may transition to a relatively suitable state, thereby improving system performance.

According to an exemplary embodiment of the present disclosure, the supporting information is a state which the terminal device is intended to transition to. The obtaining unit is configured to: determine the state which the terminal device is intended to transition to.

According to an exemplary embodiment of the present disclosure, the obtaining unit is configured to: determine the state which the terminal device is intended to transition to according to mobile state information of the terminal device and/or arrival time interval information of a current service of the terminal device.

According to an exemplary embodiment of the present disclosure, the obtaining unit is configured to: if a moving speed of the terminal device is greater than or equal to a first threshold, determine that the state which the terminal device is intended to transition to is the RRC idle state; and if the moving speed of the terminal device is smaller than the first threshold, determine that the state which the terminal device is intended to transition to is the RRC inactive state.

According to an exemplary embodiment of the present disclosure, the terminal device further includes: a determination unit configured to determine the first threshold from a plurality of thresholds corresponding to the terminal device.

According to an exemplary embodiment of the present disclosure, the plurality of thresholds correspond to a plurality of bearers of the terminal device or a plurality of data streams of the terminal device.

According to an exemplary embodiment of the present disclosure, the terminal device determines the state which the terminal device is intended to transition to according to the arrival time interval information of the current service of the terminal device, and the obtaining unit is configured to: if the arrival time interval of the current service is greater than or equal to a second threshold, determine that the state which the terminal device is intended to transition to is the RRC idle state; and if the arrival time interval of the current service is smaller than the second threshold, determine that the state which the terminal device is intended to transition to is the RRC inactive state.

According to an exemplary embodiment of the present disclosure, the terminal device further includes: a determination unit configured to determine the second threshold from a plurality of thresholds corresponding to the terminal device.

According to an exemplary embodiment of the present disclosure, the plurality of thresholds correspond to a plurality of bearers of the terminal device or a plurality of data streams of the terminal device.

According to an exemplary embodiment of the present disclosure, the supporting information includes mobile state information of the terminal device and/or arrival time interval information of a current service of the terminal device.

It should be understood that the terminal device 400 according to the embodiments of the present disclosure may correspond to the terminal device in the method embodiments of the present disclosure, and the foregoing and other operations and/or functions of respective units in the terminal device 400 are used to implement corresponding processes of the terminal device as described with reference to FIG. 4. For brevity, repeated descriptions are omitted.

Figure 7:
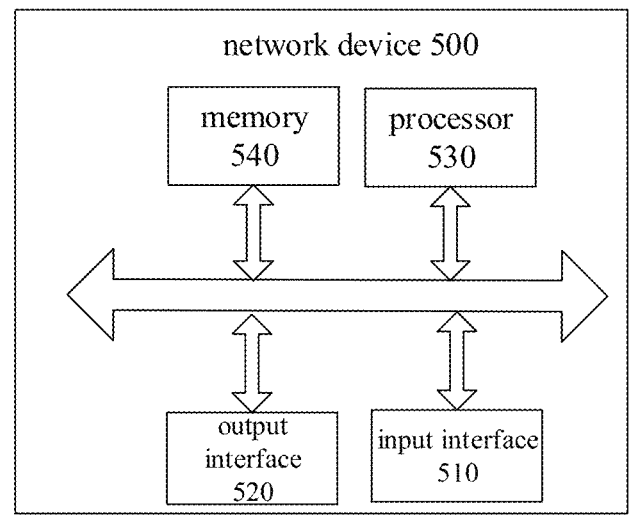
FIG. 7 shows another schematic block diagram of a network device according to an embodiment of the present disclosure.

FIG. 7 illustrates a network device 500 according to an embodiment of the present disclosure. The network device 500 may be the network device 300 in FIG. 5, and may be configured to perform steps which are performed by the network device in the method 100 as shown in FIG. 3. The network device 500 includes an input interface 510, an output interface 520, a processor 530 and a memory 540. The input interface 510, the output interface 520, the processor 530, and the memory 540 can be connected by a bus system. The memory 540 is configured to store programs, instructions or codes. The processor 530 is configured to execute the programs, instructions or codes in the memory 540 to control the input interface 510 to receive a signal, control the output interface 520 to send a signal, and complete the operations in the foregoing method embodiments.

The network device according to the embodiment of the present disclosure can determine the state which the terminal device should transition to based on some supporting information associated with the terminal device, so that the terminal device can transition to a relatively suitable state, thereby improving system performance.

It should be understood that, in the embodiments of the present disclosure, the processor 530 may be a central processing unit (CPU), and the processor 530 may also be other general-purpose processors, digital signal processors, application specific integrated circuits, and existing programmable gate arrays or other programmable logic devices, discrete gates or transistor logic devices, discrete hardware components, and so on. The general purpose processor may be a microprocessor or the processor may be any conventional processor.

The memory 540 can include a read only memory and a random access memory and provides instructions and data to the processor 530. A portion of the memory 540 may also include a non-volatile random access memory. For example, the memory 540 can also store information regarding device type.

In the implementation process, the contents of the foregoing methods may be completed by a hardware integrated logic circuit or an instruction in a form of software in the processor 530. The contents of the methods disclosed in the embodiments of the present disclosure may be directly implemented by a hardware processor, or may be performed by a combination of hardware and software modules in the processor. The software modules can be located in a conventional storage medium, such as random access memory, flash memory, read only memory, programmable read only memory or electrically erasable programmable memory, registers, and the like. The storage medium is located in the memory 540, and the processor 530 reads the information in the memory 540 and complete the contents of the above methods in conjunction with the hardware. For brevity, repeated descriptions are omitted.

In a specific implementation, the receiving unit in the network device 300 can be implemented by the input interface 510 in FIG. 7, the first determining unit, the second determining unit, and the transition unit in the network device 300 can be implemented by the processor 530 in FIG. 7.

Figure 8:
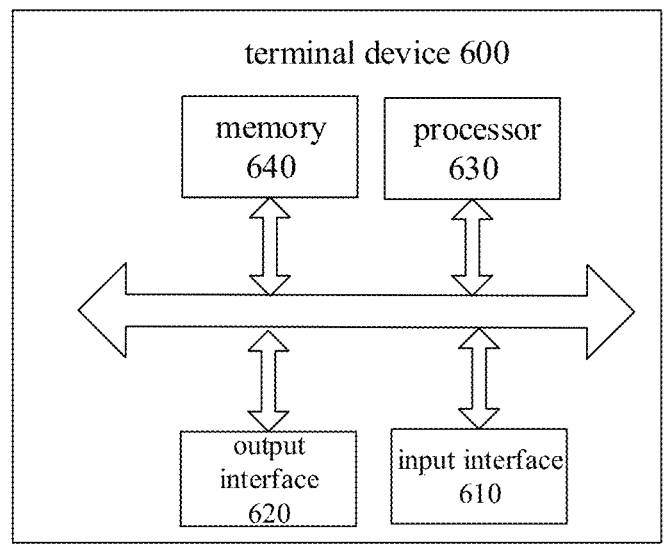
FIG. 8 shows another schematic block diagram of a terminal device according to an embodiment of the present disclosure.

FIG. 8 illustrates a terminal device 600 according to an embodiment of the present disclosure. The terminal device 600 may be the terminal device 400 in FIG. 6, and may be configured to perform steps which are performed by the terminal device in the method 200 as shown in FIG. 4. The terminal device 600 includes an input interface 610, an output interface 620, a processor 630 and a memory 640. The input interface 610, the output interface 620, the processor 630, and the memory 640 can be connected by a bus system. The memory 640 is configured to store programs, instructions or codes. The processor 630 is configured to execute the programs, instructions or codes in the memory 640 to control the input interface 610 to receive a signal, control the output interface 620 to send a signal, and complete the operations in the foregoing method embodiments.

The terminal device according to the embodiment of the present disclosure helps the network device determine the state of the terminal device to be transitioned to by reporting some supporting information to the network device. In this way, the terminal device may transition to a relatively suitable state, thereby improving system performance.

It should be understood that, in the embodiments of the present disclosure, the processor 630 may be a central processing unit (CPU), and the processor 630 may also be other general-purpose processors, digital signal processors, application specific integrated circuits, and existing programmable gate arrays or other programmable logic devices, discrete gates or transistor logic devices, discrete hardware components, and so on. The general purpose processor may be a microprocessor or the processor may be any conventional processor.

The memory 640 can include a read only memory and a random access memory and provides instructions and data to the processor 630. A portion of the memory 640 may also include a non-volatile random access memory. For example, the memory 640 can also store information regarding device type.

In the implementation process, the contents of the foregoing methods may be completed by a hardware integrated logic circuit or an instruction in a form of software in the processor 630. The contents of the methods disclosed in the embodiments of the present disclosure may be directly implemented by a hardware processor, or may be performed by a combination of hardware and software modules in the processor. The software modules can be located in a conventional storage medium, such as random access memory, flash memory, read only memory, programmable read only memory or electrically erasable programmable memory, registers, and the like. The storage medium is located in the memory 640, and the processor 630 reads the information in the memory 540 and complete the contents of the above methods in conjunction with the hardware. For brevity, repeated descriptions are omitted.

In a specific implementation, the sending unit in the terminal device 400 can be implemented by the output interface 620 in FIG. 8, the obtaining unit and the determination unit in the terminal device 400 can be implemented by the processor 630 in FIG. 8.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods to implement the described functions for each particular application, but such implementation should not be considered to be beyond the scope of the present disclosure.

A person skilled in the art can clearly understand that for the convenience and brevity of the description, the specific working process of the system, the device and the unit described above can refer to the corresponding process in the foregoing method embodiments, and details are not described herein again.

In the several embodiments provided by the present disclosure, it should be understood that the disclosed systems, devices, and methods may be implemented in other manners. For example, the device embodiments described above are merely illustrative. For example, the division of the units is only a logical function division. In actual implementation, there may be another division manner, for example, multiple units or components may be combined or may be Integrate into another system, or some features can be ignored or not executed. In addition, the mutual coupling or direct coupling or communication connection shown or discussed may be an indirect coupling or communication connection through some interface, device or unit, and may be in an electrical, mechanical or other form.

The units described as separate components may or may not be physically separated, and the components displayed as units may or may not be physical units, that is, may be located in one place, or may be distributed to multiple network units. Some or all of the units may be selected according to actual needs to achieve the purpose of the solutions of the embodiments.

In addition, each functional unit in each embodiments of the present disclosure may be integrated into one processing unit, or each unit may exist physically separately, or two or more units may be integrated into one unit.

The functionality, if implemented as a software functional unit and sold or used as a standalone product, can be stored on a computer readable storage medium. Based on such understanding, the technical solution of the present disclosure, which is essential or contributes to the prior art, or a part of the technical solutions, may be embodied in the form of a software product, which is stored in a storage medium, including instructions which are used to cause a computer device (which may be a personal computer, server, or network device, etc.) to perform all or part of the steps of various embodiments of the present disclosure. The foregoing storage medium includes: a U disk, a mobile hard disk, a read-only memory (ROM), a random access memory (RAM), a magnetic disk, or an optical disk, and the like, which can store program codes.

The foregoing is only specific embodiments of the present disclosure, but the scope of protection of the present disclosure is not limited thereto, and any person skilled in the art can easily think of changes or substitutions within the technical scope disclosed in the present disclosure. It should be covered by the scope of protection of this application. Therefore, the scope of protection of the present disclosure should be determined by the appended claims.

What is claimed is:

1. A transition method, comprising:
   sending, by a network device, indication information to a terminal device, the indication information being used to indicate that there is currently no downlink data to be transmitted;
   after sending the indication information, receiving, by the network device, supporting information associated with the terminal device which is sent from the terminal device;
   determining, by the network device, a target state of the terminal device to be transitioned to according to the supporting information, wherein the target state is a Radio Resource Control (RRC) idle state or an RRC inactive state; and
   enabling, by the network device, the terminal device to transition to the target state;
   wherein the supporting information comprises mobile state information of the terminal device and arrival time interval information of a current service of the terminal device;
   wherein determining, by the network device, a target state of the terminal device to be transitioned to according to the supporting information, comprises:
   determining, by the network device, the target state according to the mobile state information and/or the arrival time interval information;
   wherein determining, by the network device, the target state according to the mobile state information comprises:
   if a moving speed of the terminal device is greater than or equal to a first threshold, determining by the network device that the target state is the RRC idle state; and
   if the moving speed of the terminal device is smaller than the first threshold, determining by the network device that the target state is the RRC inactive state;
   wherein enabling, by the network device, the terminal device to transition to the target state, comprises:
   if the target state is the RRC idle state, releasing by the network device all radio bearers between the terminal device and the network device; and
   if the target state is the RRC inactive state, releasing by the network device a part of the radio bearers between the terminal device and the network device.

2. The method according to claim 1, further comprising:
    determining, by the network device, the first threshold from a plurality of thresholds corresponding to the terminal device.

3. The method according to claim 2, wherein the plurality of thresholds correspond to a plurality of bearers of the terminal device or a plurality of data streams of the terminal device.

4. The method according to claim 1, wherein determining, by the network device, the target state according to the arrival time interval information comprises:
    if the arrival time interval of the current service is greater than or equal to a second threshold, determining by the network device that the target state is the RRC idle state; and
    if the arrival time interval of the current service is smaller than the second threshold, determining by the network device that the target state is the RRC inactive state.

5. The method according to claim 4, further comprising:
    determining, by the network device, the second threshold from a plurality of thresholds corresponding to the terminal device.

6. The method according to claim 5, wherein the plurality of thresholds correspond to a plurality of bearers of the terminal device or a plurality of data streams of the terminal device.

7. A network device, comprising:
    a processor;
    a memory for storing instructions executable by the processor;
    an input interface configured to send indication information to a terminal device, the indication information being used to indicate that there is currently no downlink data to be transmitted, and after the indication information is sent, receive supporting information associated with the terminal device which is sent from the terminal device;
    wherein the processor is configured to:
        determine a target state of the terminal device to be transitioned to according to the supporting information, wherein the target state is a Radio Resource Control (RRC) idle state or an RRC inactive state; and
        enable the terminal device to transition to the target state;
    wherein the supporting information comprises mobile state information of the terminal device and arrival time interval information of a current service of the terminal device;
    wherein the processor is configured to:
        determine the target state according to the mobile state information and/or the arrival time interval information;
    wherein determining the target state according to the mobile state information comprises:
        if a moving speed of the terminal device is greater than or equal to a first threshold, determining that the target state is the RRC idle state; and
        if the moving speed of the terminal device is smaller than the first threshold, determining that the target state is the RRC inactive state;
    wherein the processor is configured to:
        if the target state is the RRC idle state, release all radio bearers between the terminal device and the network device; and
        if the target state is the RRC inactive state, release a part of the radio bearers between the terminal device and the network device.

8. The network device according to claim 7, wherein the processor is further configured to:
    determine the first threshold from a plurality of thresholds corresponding to the terminal device.

9. The network device according to claim 8, wherein the plurality of thresholds correspond to a plurality of bearers of the terminal device or a plurality of data streams of the terminal device.

10. The network device according to claim 7, wherein the processor is configured to:
    if the arrival time interval of the current service is greater than or equal to a second threshold, determine that the target state is the RRC idle state; and
    if the arrival time interval of the current service is smaller than the second threshold, determine that the target state is the RRC inactive state.

11. The network device according to claim 10, wherein the processor is further configured to:
    determine the second threshold from a plurality of thresholds corresponding to the terminal device.

12. The network device according to claim 11, wherein the plurality of thresholds correspond to a plurality of bearers of the terminal device or a plurality of data streams of the terminal device.

* * * * *